Dec. 11, 1945.   L. E. FANKHOUSER ET AL   2,390,930
LUBRICATING COUPLER
Filed May 11, 1944
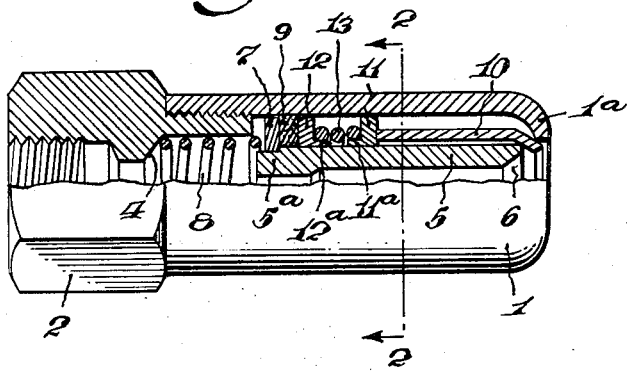
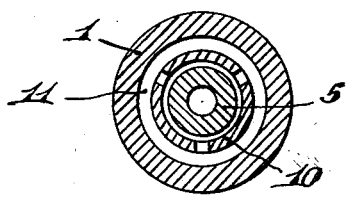
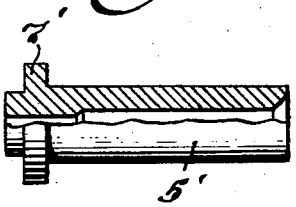
Inventors
Leonard E. Fankhouser
Edwin H. Glotfelty
By Stone, Boyden & Mack
Attorneys Patented Dec. 11, 1945

2,390,930

UNITED STATES PATENT OFFICE 2,390,930

LUBRICATING COUPLER

Leonard E. Fankhouser and Edwin H. Glotfelty, Pittsburgh, Pa., assignors to Industrial Machine and Supply Co., Pittsburgh, Pa., a corporation of Pennsylvania Application May 11, 1944, Serial No. 535,190

4 Claims. (Cl. 285—169)

This invention relates to lubricating apparatus, and more particularly to a coupler for connecting high pressure grease dispensing devices to lubricant receiving fittings of the headed type.

Among the objects of the invention are to provide a coupler of this type, which shall be easy to manipulate, efficient in operation, and which is of simple construction and capable of being manufactured at low cost.

In order that the invention may be readily understood, reference is had to the accompanying drawing, forming part of this specification, and in which:

Fig. 1 is a view, partly in side elevation and partly in longitudinal section, showing our improved coupler complete;

Fig. 2 is a transverse section substantially on the line 2—2 of Fig. 1, looking in the direction of the arrows;

Fig. 3 is a sectional view of one of the improved annuli or washers which we employ; and Fig. 4 is a view partly in side elevation and partly in longitudinal section, showing a slightly modified construction of the plunger illustrated in Fig. 1.

Referring to the drawing in detail, our improved coupler comprises a tubular member or head 1, contracted at one end and having at the opposite end internal threads engaging a threaded nipple on an adapter or body 2. The interior of this adapter is provided with an internal annular shoulder 4, the purpose of which will be hereinafter described.

Mounted for longitudinal movement within the tubular member 1 is a hollow plunger 5, having one end 6 disposed adjacent the contracted end 1ª of the tubular member, and shaped to form a seat to receive a headed grease fitting of the usual type. The exterior of the other end of the plunger 5 is of slightly reduced diameter, as indicated at 5ª, and shrunk or otherwise rigidly secured upon this reduced portion is a ring 7 constituting a shoulder. This ring or shoulder is of slightly smaller diameter than the interior of the tubular member 1, so as to be capable of moving freely therein.

Interposed between this ring or shoulder 7 and the shoulder 4 formed on the adapter 2, is a compression spring 8, which normally tends to urge said plunger toward the contracted end of said tubular member.

Surrounding the plunger and bearing against the face of the shoulder 7, opposite to that engaged by the spring 8, is a packing element or washer, made of leather or similar soft material.

Enclosed within the tubular member 1, adjacent its contracted end and located in the space between the interior of said tubular member and the plunger 5, and are a plurality of freely movable gripping jaws 10, three of such jaws being illustrated, as is the common practice. One end of these jaws extends somewhat beyond the seat 6, and the other end abuts an annulus 11, slidably mounted on the plunger 5.

A second similar annulus 12 is also mounted on the plunger, at a point spaced from the first, and interposed between the two annuli 11 and 12 is a compression spring 13.

As best shown in Fig. 3, the annulus 11 is formed adjacent its inner periphery with an axially extending flange 11ª, and the annulus 12 is formed with a similar flange 12ª, said flanges projecting toward each other, as shown in Fig. 1. The spring 13 is of such diameter as to encircle these flanges at its ends, and, in this way, the spring is accurately centered and securely held in a position spaced from the surface of the plunger itself.

The packing element or washer 9 is confined between the annulus 12 and the shoulder 7, and is more or less compressed by the spring 13. It will be understood that this packing element makes sealing engagement with the inner surface of the tubular member 1, and thus, together with the plunger 5 and associated parts, constitutes a piston capable of moving longitudinally within said tubular member.

When the coupler is applied to a headed grease fitting, and pressed thereagainst, both the plunger 5 and the jaws 10 are retracted or forced inwardly. This permits the jaws 10 to expand, and to engage over and grip the head of the fitting, which rests against the seat 6, thus forming a grease tight seal. The inner end 3 of the adapter 2 constitutes a stop against which the shoulder 7 abuts, and thus serves to limit the inward movement of the plunger.

Grease under pressure is delivered to the coupling from a grease gun or tube screwed into the adapter 2.

Instead of securing the shoulder 7 to the plunger 5, as by shrinking or welding, it may be formed integral therewith. This is illustrated in Fig. 4, in which a shoulder 7' is formed integral with the plunger 5'.

From the foregoing, it will be seen that we have provided a coupler of very simple construction, comprising only a few parts, and it is thought that the advantages of the invention will be readily appreciated by those skilled in the art.

What we claim is:

1. A lubricating coupler comprising a tubular member contracted at one end, a plunger, a packing element fixedly carried thereby and making sealing engagement with the interior of said tubular member, said plunger and packing element together constituting a piston movable in said tubular member, the end of said plunger adjacent said contracted end of said tubular member having a seat to receive a headed fitting, freely movable gripping jaws surrounding said plunger adjacent said seat, an annulus slidably mounted on said plunger, against which annulus said jaws abut, a compression spring exerting thrust between said annulus and packing element, and a spring for moving said piston in one direction.

2. A lubricating coupler comprising a tubular member contracted at one end, freely movable gripping jaws carried in said end for engaging a headed fitting, a plunger movably mounted within said jaws and having an axial passageway, the outer end of said plunger lying adjacent the ends of said jaws and formed with a seat to receive said fitting, a packing element fixedly carried by said plunger and making sealing engagement with the interior of said tubular member, an annulus slidably surrounding said plunger, against which annulus said jaws abut, a compression spring interposed between said annulus and said packing element, and means for yieldingly urging said plunger toward the contracted end of said member.

3. A lubricating coupler comprising the usual tubular member having a contracted end, and freely movable gripping jaws carried therein, a plunger mounted within said jaws and having an annular shoulder at a point remote therefrom, an annular packing element surrounding said plunger, an annulus movable on said plunger, and means for yieldingly compressing said packing element between said shoulder and said annulus.

4. A lubricating coupler comprising the usual tubular member having a contracted end, and freely movable gripping jaws carried therein, a plunger mounted within said jaws and having an annular shoulder at a point remote therefrom, two spaced annuli movable on said plunger and having axially projecting flanges at one side, extending toward each other, an annular packing element interposed between said shoulder and one of said annuli, the other of said annuli abutting said jaws, and a compression spring interposed between said two annuli and surrounding said flanges.

LEONARD E. FANKHOUSER.
EDWIN H. GLOTFELTY.